US007485165B2

(12) United States Patent
Lee et al.

(10) Patent No.: US 7,485,165 B2
(45) Date of Patent: Feb. 3, 2009

(54) AIR FILTERING DEVICE FOR PROTECTION SUITS

(75) Inventors: Sen-Yung Lee, Tainan (TW); Shueei-Muh Lin, Tainan (TW); Xi-Zhang Lin, Tainan (TW); Sheng-Jye Hwang, Tainan (TW)

(73) Assignee: National Cheng Kung University, Tainan (TW)

( * ) Notice: Subject to any disclaimer, the term of this patent is extended or adjusted under 35 U.S.C. 154(b) by 597 days.

(21) Appl. No.: 11/318,859

(22) Filed: Dec. 28, 2005

(65) Prior Publication Data

US 2007/0144353 A1 Jun. 28, 2007

(51) Int. Cl.
*B01D 39/00* (2006.01)

(52) U.S. Cl. ............................ 55/356; 55/471; 55/472; 55/486; 96/385; 181/212; 181/264

(58) Field of Classification Search .................. 55/356, 55/357, 471, 472, 486, DIG. 33; 96/384, 96/385, 380; 181/212, 256, 257, 264
See application file for complete search history.

(56) References Cited

U.S. PATENT DOCUMENTS 4,213,224 A * 7/1980 Miller ......................... 15/344

* cited by examiner

*Primary Examiner*—Robert A Hopkins
(74) *Attorney, Agent, or Firm*—Rosenberg, Klein & Lee

(57) ABSTRACT

An air filtering device for protection suits includes a case in which a fan unit is received and a filtering unit is engaged with a hole in a wall of the case and located outside of the case. A duct of the fan unit extends through a top of the case and is in communication with a muffler connected on the top of the case. A hose is connected with an aperture of the muffler. The fan unit can be driven by AC or DC power and the noise from the fan unit can be reduced by the muffler.

6 Claims, 7 Drawing Sheets

AIR FILTERING DEVICE FOR PROTECTION SUITS

FIELD OF THE INVENTION

The present invention relates to an air filtering device for protection suits and the device is easily to operate and maintain.

BACKGROUND OF THE INVENTION

A conventional air filtering device "B" for protection suits is shown in FIG. 7 and generally includes a case 7 having a top hole and a bottom hole, a filtering material 8 is received in the case 7 and a fan unit 9 is located above the filtering material 8 and faces the top hole. A hose 10 has one end engaged with the top hole and the other end of the hose 10 is in communication with an interior of the protection suit. The air is sucked into the case 7 by the fan unit 9 and filtered by the filtering material 8, and then is sent to the wearer.

However, the fan unit 9 cannot provide sufficient amount air to the wearer and the fan generates a lot of noise when in operation so that the wearer is suffered by the noise. The filtering material 8 is received in the case 7 and difficult to replace and maintain.

The present invention intends to provide an air filtering device for protection suits and includes a muffler for reducing noise from the fan unit. The filtering material is located at outside of the case so that it is easily to be replaced.

SUMMARY OF THE INVENTION

The present invention relates to an air filtering device that comprises a case with a hole defined through a wall thereof and a filtering unit is engaged with the hole and located outside of the case. A fan unit is received in the case and has a duct which extends through a top of the case. A muffler is connected on the top of the case and has at least one separation plate received therein so as to reduce the noise of the fan unit. A hose is connected with an aperture defined through a wall of the muffler and connected the interior of the protection suit.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
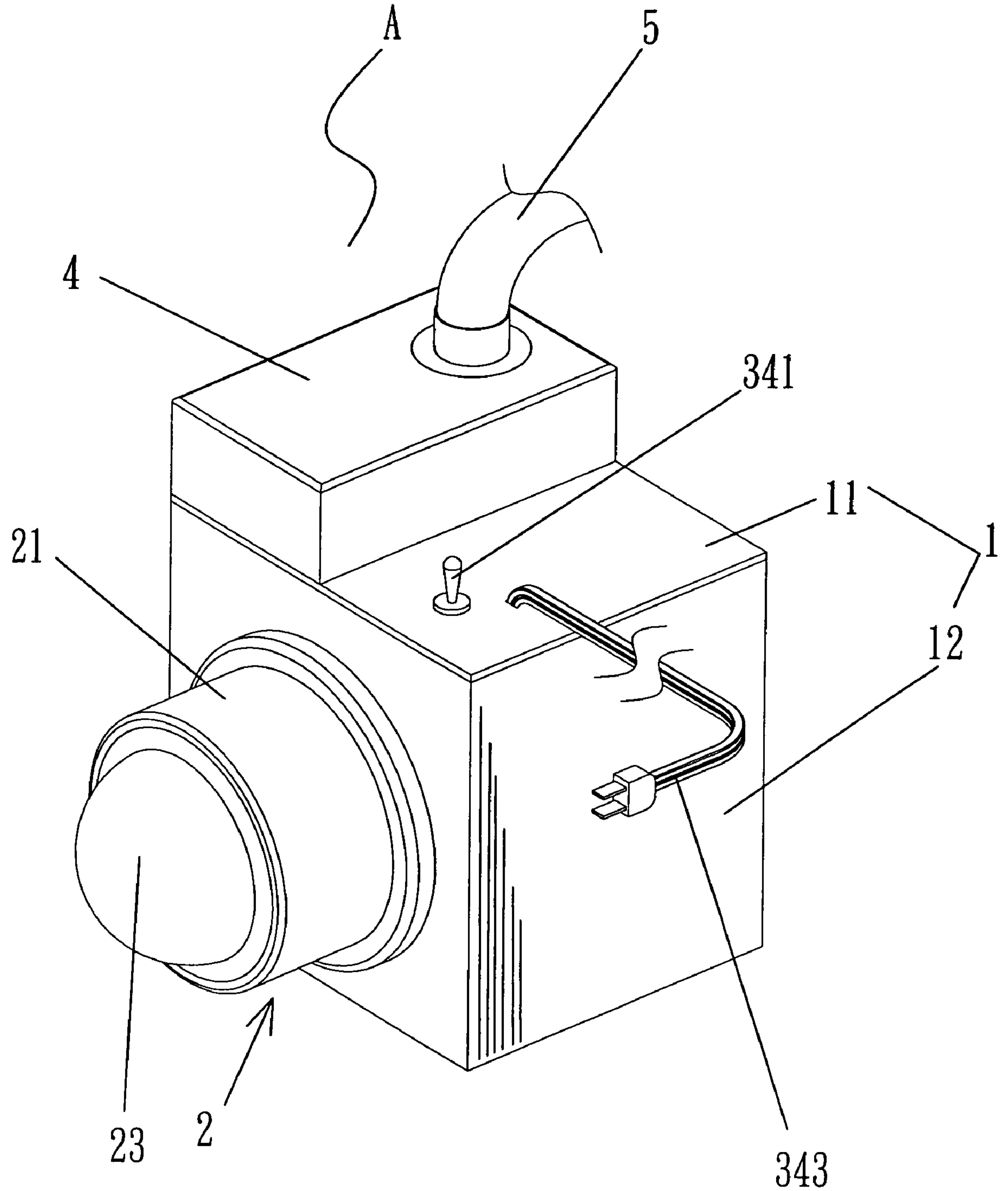
FIG. 1 is a perspective view to show the air filtering device of the present invention.
Figure 2:
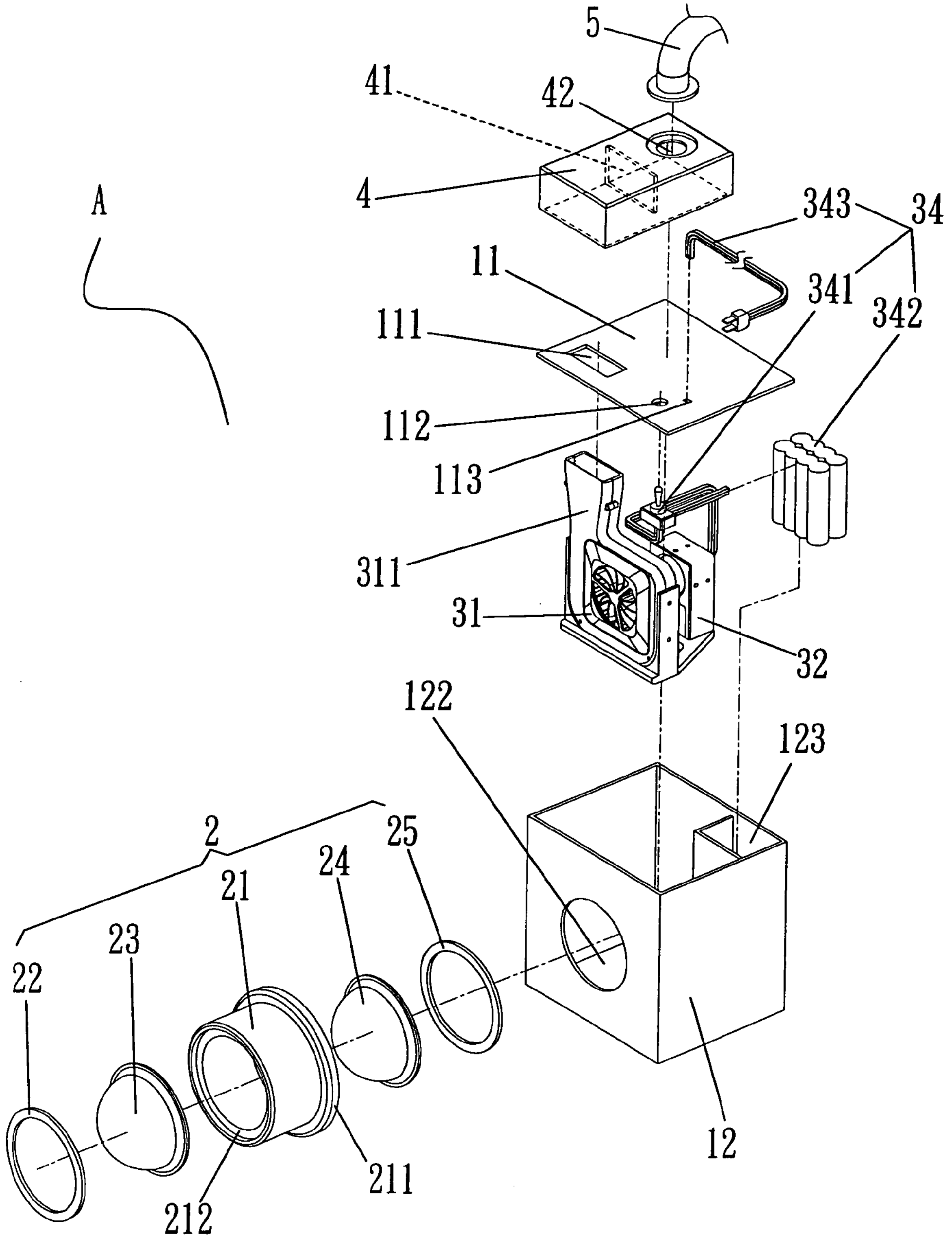
FIG. 2 is an exploded view to show the air filtering device of the present invention.
Figure 3:
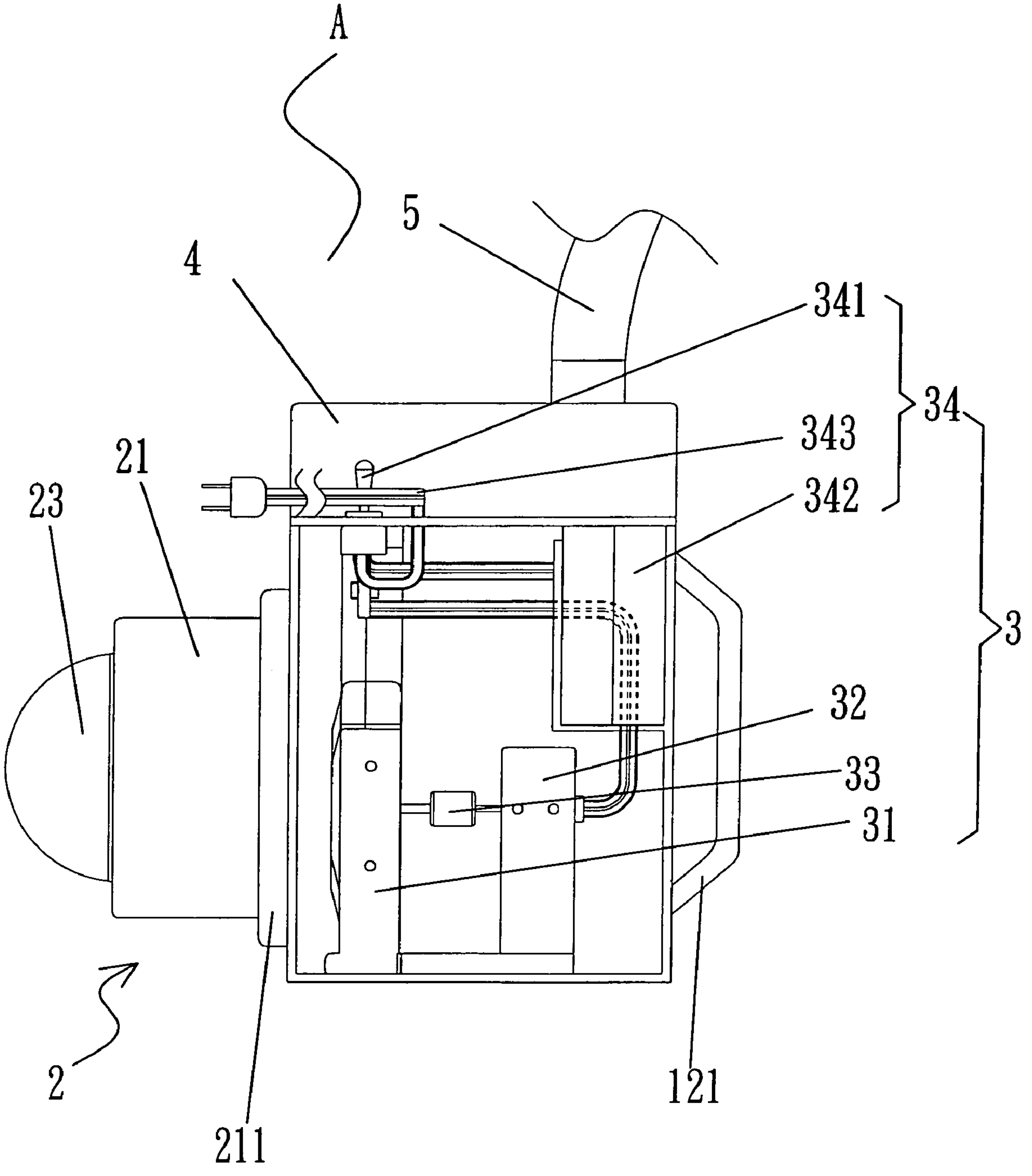
FIG. 3 is a side view to show the air filtering device of the present invention.
Figure 4:
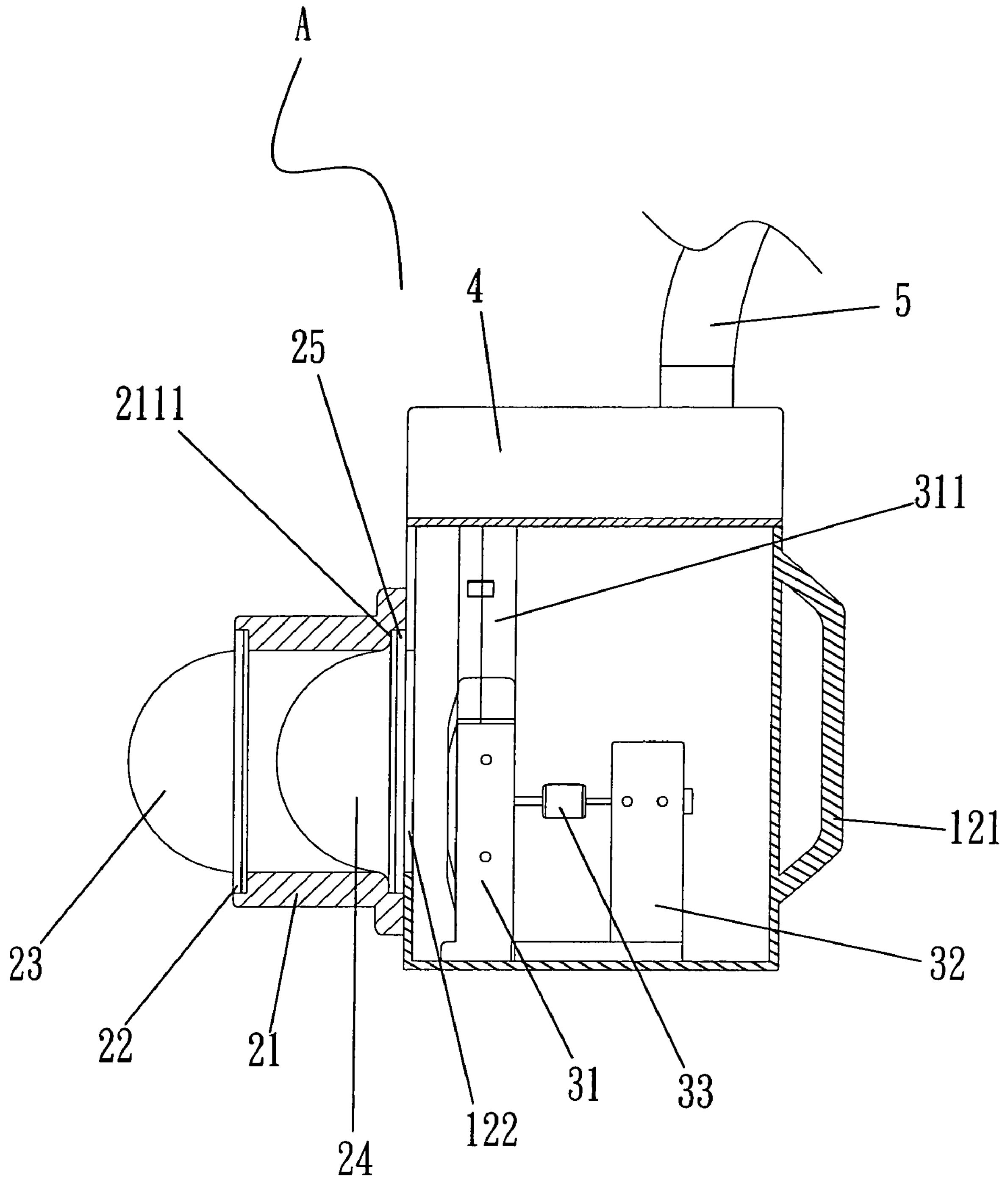
FIG. 4 shows the fan unit in the case.

Referring to FIGS. 1 to 4, the air filtering device "A" for protection suits of the present invention comprises a case 1 having box-like base 12 and a top 11 which is connected to a open top of the base 12. An engaging hole 122 is defined through a wall of the base 12 and a filtering unit 2 is engaged with the engaging hole 122 and located outside of the case 1.

The filtering unit 2 includes a tube 21 and a flange 211 extends radially from a first end of the tube 21. The flange 211 includes a first groove 2111 defined therein and a first filtering member 24 and a first positioning ring 25 are engaged with the first groove 2111. A second groove 212 is defined in an inner periphery of a second end of the tube 21, and a second filtering member 23 and a second positioning ring 22 are engaged with the second groove 121. It is noted that the first and second filtering members 24, 23 can be active carbon, filtering fibers or any known filtering material such as used in N95 mask or P100 mask.

A fan unit 3 is received in the case 1 and has a duct 311 which extends through a first hole 111 top 11 of the case 1. The fan unit 3 includes a centrifugal fan 31, a motor 32 for driving the fan 31 and a power assembly 34. A coupler 33 is connected between the motor 32 and the fan 31. The power assembly 34 of the fan unit 3 includes a switch 341 which extends through a second hole 112 defined through the top 11 of the case 7, a cord 343 which extends through a third hole 113 defined through the top 11 of the case 1 and a plug is connected to the cord 343, and a battery 342 which is received in a chamber 123 defined in the case 7. The switch 341 can be shifted to change the power mold for power the motor 32. In other words, the user can use DC power from the battery 342 or AC power by plugging in receptacles in buildings to power the motor 342 when needed. The battery 342 can be a rechargeable battery so that when the motor 32 is powered by AC power, the rechargeable battery is charged.

A muffler 4 is connected on the top 11 of the case 1 and includes an open bottom which is in communication with the first hole 111 in the top 11 of the case 7. At least one separation plate 41 is received in the muffler 4 so as to form a path such that the noise is reduced. An aperture 42 is defined through a wall of the muffler 4 and an end of a hose 5 is connected with the aperture 42, the other end of the hose 5 is connected to the protection suit.

Figure 5:
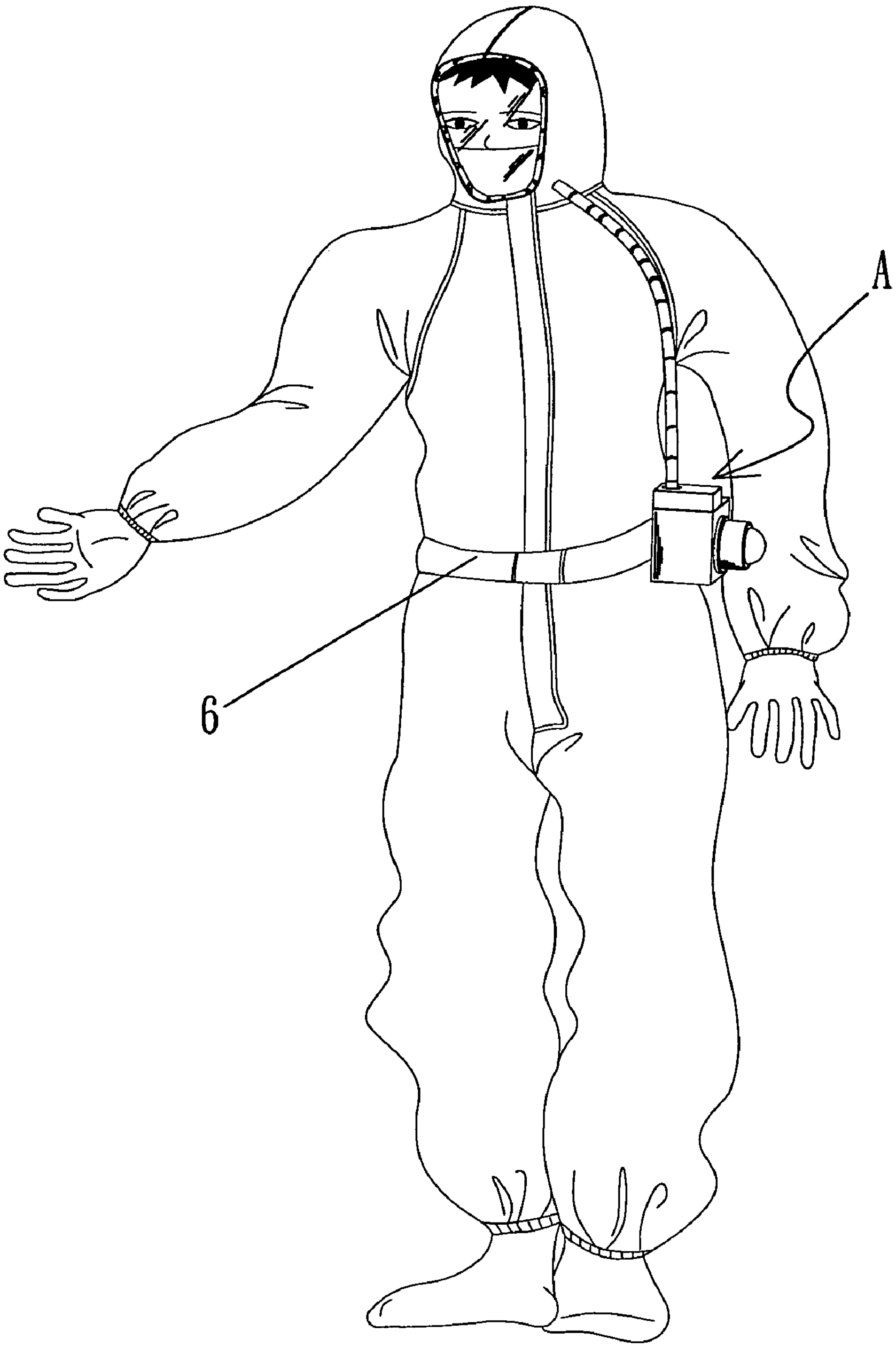
FIG. 5 shows a wearer wearing a protection suit and the air filtering device is tied on the wearer's waist.

A retaining member 121 is connected to the case 7 and located opposite to the filtering unit 2. A gap is defined between the retaining member 121 and the case 7 so that the device "A" can be positioned on the users waist by a belt 6 as shown in FIG. 5.

Figure 6:
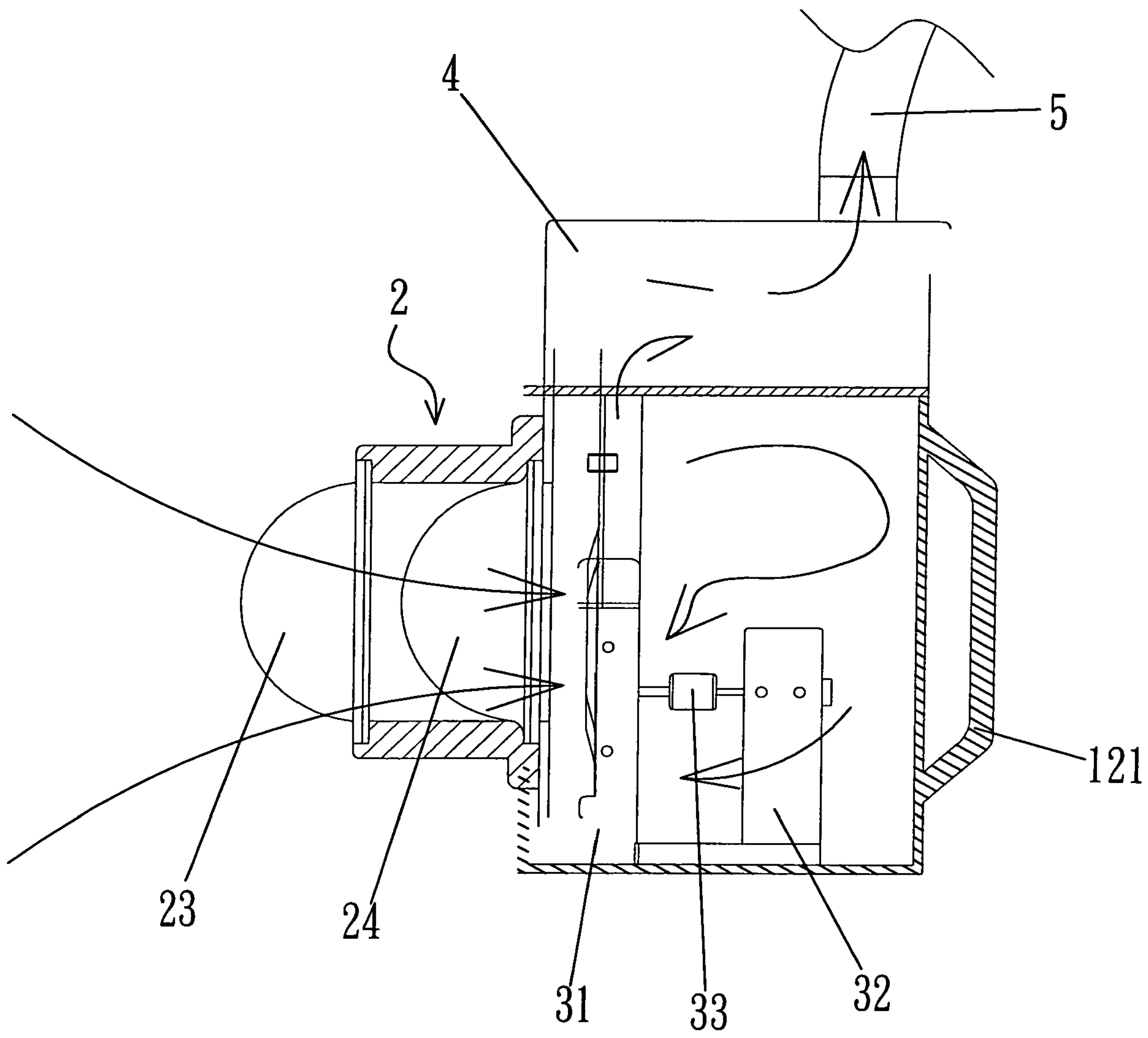
FIG. 6 shows air is sucked into the case via the filtering material.
Figure 7:
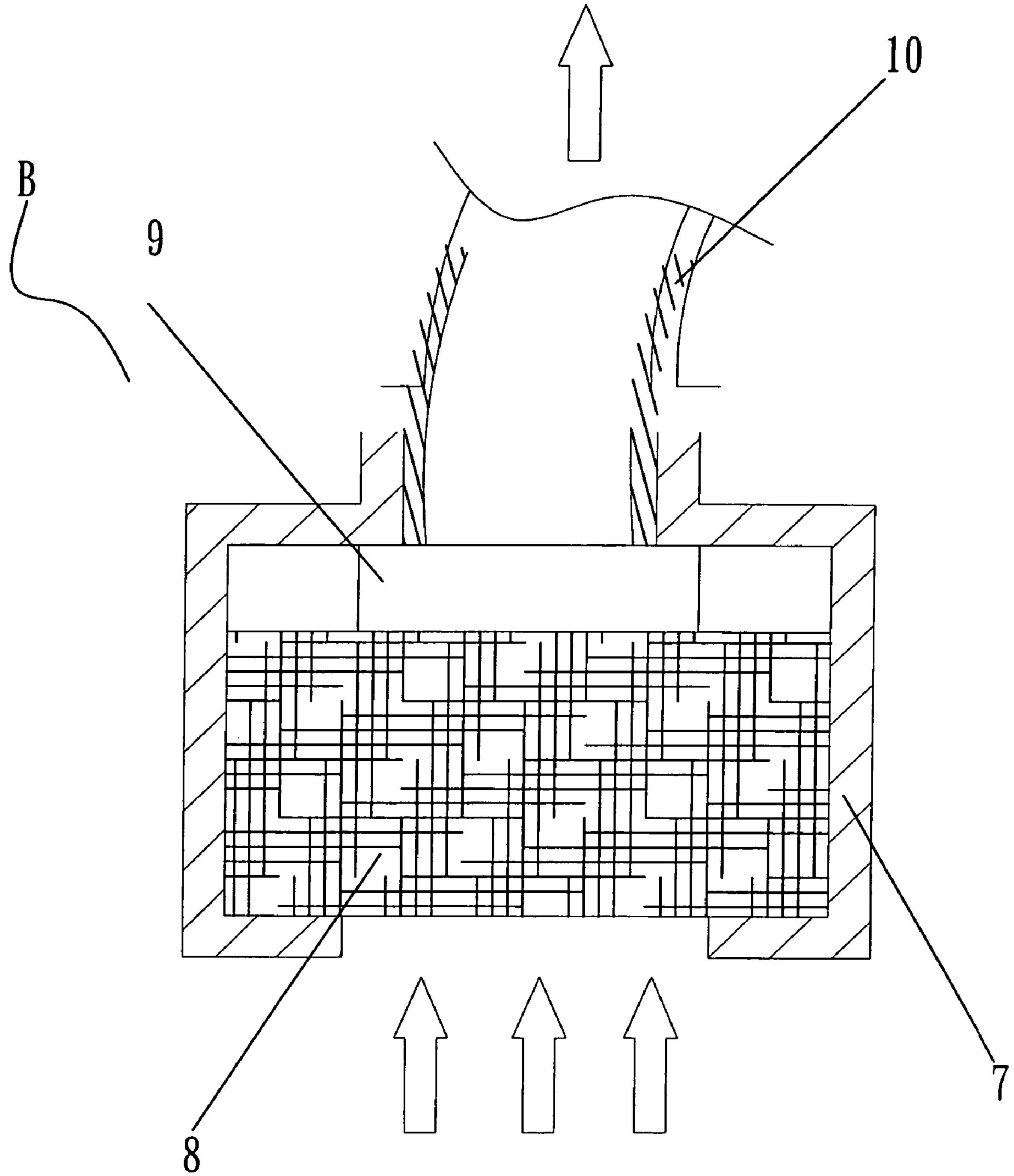
FIG 7 (PRIOR ART)
FIG. 7 shows a conventional air filtering device.

As shown in FIG. 6, air is sucked into the case 7 via the filtering unit 2 and the filtered air is sent into the muffler 4 via the duct 311 and then sent to an interior of the protection suit.

The filtering unit 2 can be easily replaced or maintained because it is located at outside of the case 7 and the fan unit 3 provide sufficient amount of air flows to form a positive pressure in the protection suit and remove heat from the wearer.

While we have shown and described the embodiment in accordance with the present invention, it should be clear to those skilled in the art that further embodiments may be made without departing from the scope of the present invention.

What is claimed is:

1. An air filtering device comprising:

a case having a hole defined through a wall thereof and a filtering unit engaged with the hole and located outside of the case;

a fan unit received in the case and having a duct which extends through a top of the case, and a muffler connected on the top of the case and having at least one separation plate received therein, an aperture defined through a wall of the muffler and a hose connected with the aperture.

2. The device as claimed in claim 1, wherein the filtering unit includes a tube and a flange extends radially from a first end of the tube, the flange includes a first groove defined therein, a first filtering member and a first positioning ring are engaged with the first groove, a second groove defined in an inner periphery of a second end of the tube, a second filtering member and a second positioning ring are engaged with the second groove.

3. The device as claimed in claim 1, wherein the fan unit includes a fan, a motor for driving the fan and a power assembly which includes a switch which extends through the top of the case, a cord with a plug and a battery which is received in a chamber defined in the case.

4. The device as claimed in claim 3, wherein the fan unit includes a centrifugal fan.

5. The device as claimed in claim 3, wherein a coupler is connected between the motor and the fan.

6. The device as claimed in claim 1, wherein a retaining member is connected to the case and located opposite to the filtering unit, a gap is defined between the retaining member and the case.

* * * * *